United States Patent
Brandt et al.

(10) Patent No.: US 8,171,780 B2
(45) Date of Patent: May 8, 2012

(54) METHOD AND DEVICE FOR ESTIMATING AN EMISSION OF AT LEAST ONE EXHAUST GAS COMPONENT

(75) Inventors: Martin Brandt, Wörth a.d. Donau (DE); Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 416 days.

(21) Appl. No.: 12/538,236

(22) Filed: Aug. 10, 2009

(65) Prior Publication Data

US 2010/0037676 A1    Feb. 18, 2010

(30) Foreign Application Priority Data

Aug. 12, 2008    (DE) .................. 10 2008 038 678

(51) Int. Cl.
*G01M 15/10*    (2006.01)
(52) U.S. Cl. ............................................. 73/114.71
(58) Field of Classification Search .............. 73/114.69, 73/114.71, 114.72, 114.73, 114.75
See application file for complete search history.

(56) References Cited

U.S. PATENT DOCUMENTS

| | | | | |
|---|---|---|---|---|
| 5,987,883 | A | * 11/1999 | Schneider | 60/274 |
| 2004/0261402 | A1 | * 12/2004 | Sealy et al. | 60/285 |
| 2007/0144145 | A1 | * 6/2007 | Takatsuto et al. | 60/277 |
| 2007/0199309 | A1 | * 8/2007 | Yano et al. | 60/286 |
| 2008/0098725 | A1 | 5/2008 | Kesse et al. | |
| 2010/0037592 | A1 | * 2/2010 | Brandt et al. | 60/277 |

FOREIGN PATENT DOCUMENTS

DE    19810483 A1    9/1999

OTHER PUBLICATIONS

German Office Action, German Application No. 10 2008 038 678.2-26, 4 pages, Feb. 12, 2009.

* cited by examiner

*Primary Examiner* — Eric S McCall
(74) *Attorney, Agent, or Firm* — King & Spalding L.L.P.

(57) ABSTRACT

An exhaust-gas sensor signal (vls_down) of an exhaust-gas sensor that is disposed in an exhaust gas train downstream of at least one first catalytic converter volume (V1) and upstream of at least one second catalytic converter volume (V2) is acquired. An estimated value of an intermediate emission for a position of the exhaust-gas sensor is determined in dependence upon the exhaust-gas sensor signal (vls_down). An estimated value of an emission downstream of the at least one second catalytic converter volume (V2) is determined in dependence upon the estimated value of the intermediate emission and in dependence upon at least one predefined correction characteristic (fac_cor_ufc) or at least one predefined correction characteristics map for correcting the estimated value of the intermediate emission with regard to an influence of the at least one second catalytic converter volume (V2) upon the emission of the at least one exhaust gas component.

17 Claims, 3 Drawing Sheets

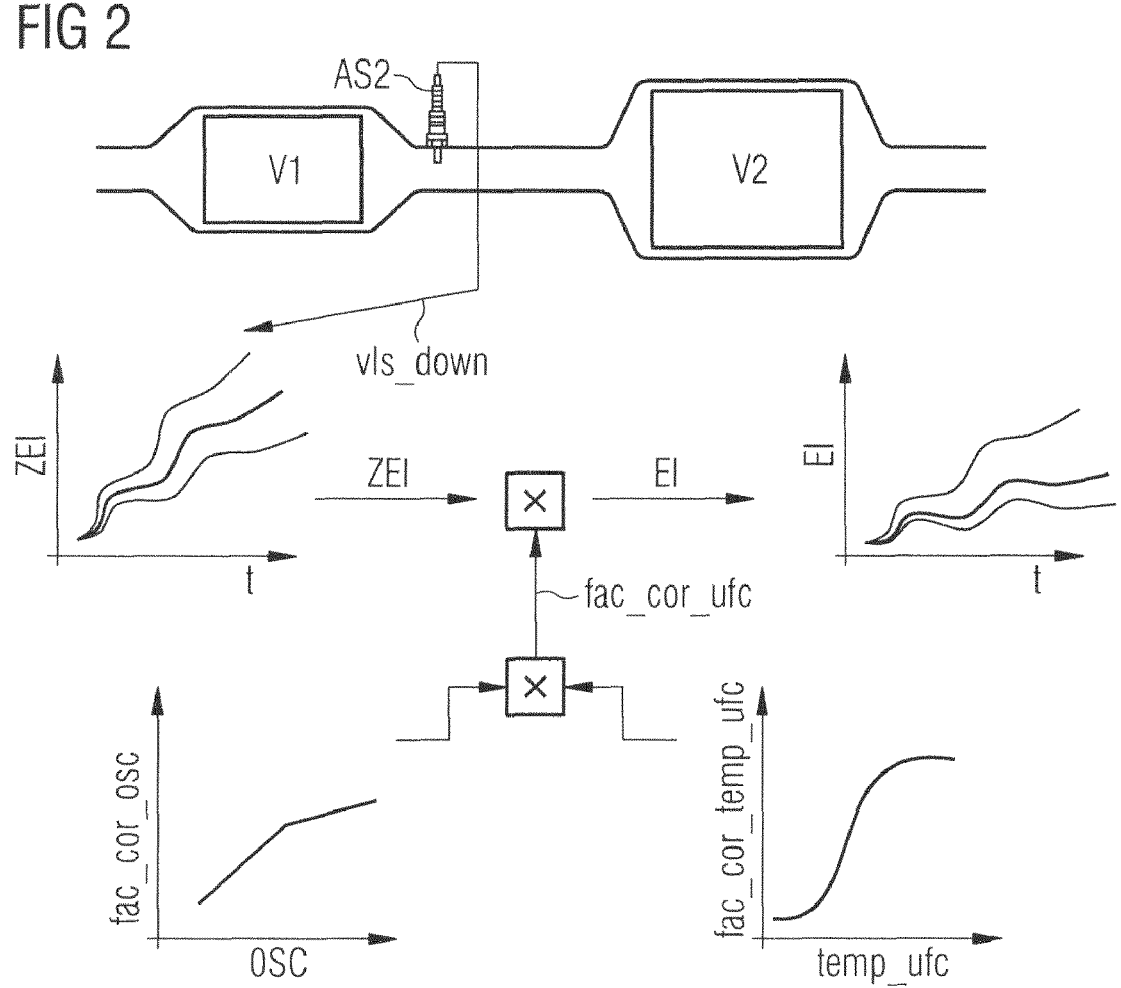

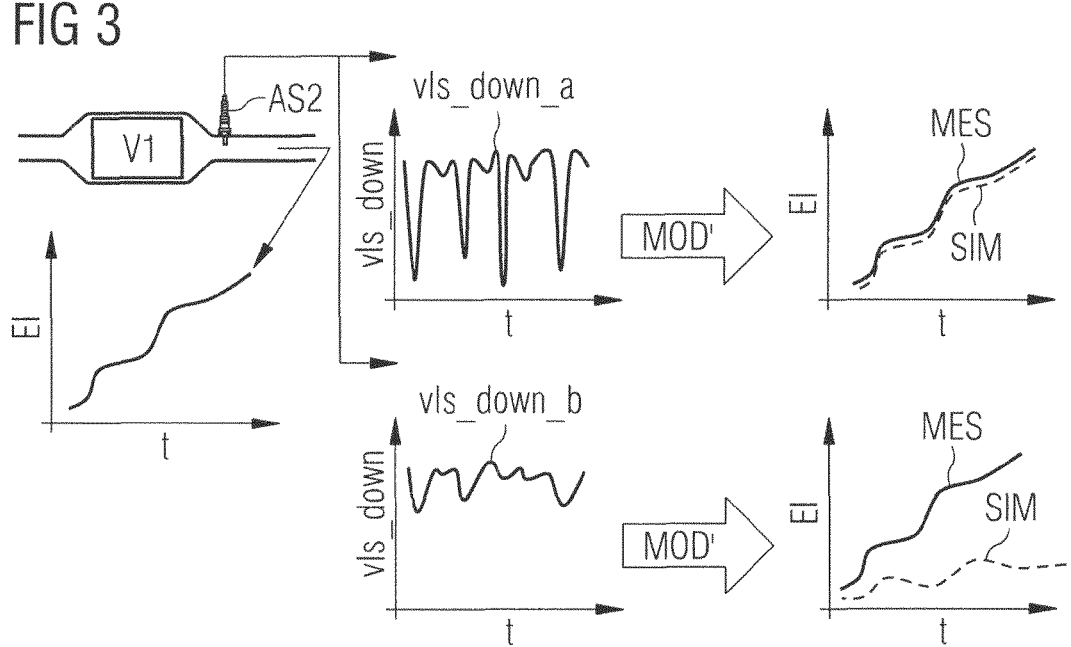
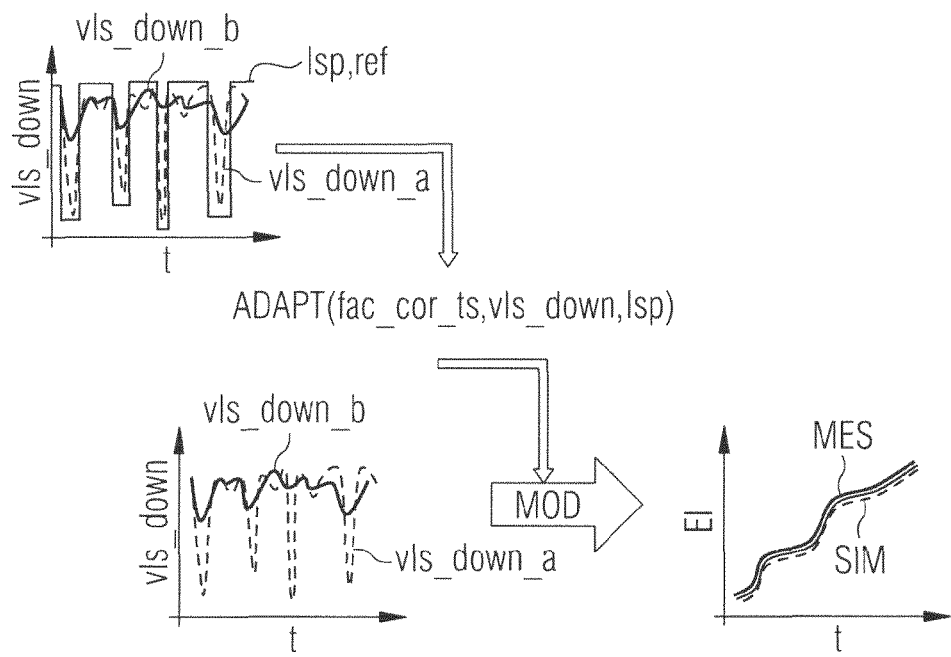

METHOD AND DEVICE FOR ESTIMATING AN EMISSION OF AT LEAST ONE EXHAUST GAS COMPONENT

CROSS-REFERENCE TO RELATED APPLICATIONS

This application claims priority to DE Patent Application No. 10 2008 038 678.2 filed Aug. 12, 2008, the contents of which is incorporated herein by reference in its entirety.

TECHNICAL FIELD

The invention relates to a method and a device for estimating an emission of at least one exhaust gas component, in particular of an internal combustion engine of a motor vehicle, by means of an emission model.

BACKGROUND

Increasingly strict statutory regulations regarding admissible pollutant emissions in motor vehicles, in which internal combustion engines are disposed, make it necessary to keep the pollutant emissions during operation of the internal combustion engine as low as possible. This may be done firstly by reducing the pollutant emissions that arise during combustion of the air-fuel mixture in the respective cylinders. Secondly, in internal combustion engines use is made of exhaust gas after-treatment systems, by means of which the pollutant emissions produced during the process of combustion of the air-fuel mixture in the respective cylinder are converted into harmless substances. Especially in gasoline internal combustion engines, three-way catalytic converters are used as catalytic converters. In this connection it is necessary to ensure that the components of the exhaust gas after-treatment system also function in the desired manner over a long operating period and that faults are reliably detected.

SUMMARY

According to various embodiments, a method and a device can be provided for estimating an emission of at least one exhaust gas component that enable a reliable diagnosis.

According to an embodiment, a method of estimating an emission of at least one exhaust gas component, may comprise the steps of—an exhaust-gas sensor signal of an exhaust-gas sensor that is disposed in an exhaust gas train downstream of at least one first catalytic converter volume and upstream of at least one second catalytic converter volume is acquired, —an estimated value of an intermediate emission for a position of the exhaust-gas sensor is determined in dependence upon the exhaust-gas sensor signal and—an estimated value of the emission downstream of the at least one second catalytic converter volume is determined in dependence upon the estimated value of the intermediate emission and in dependence upon at least one predefined correction characteristic or at least one predefined correction characteristics map for correcting the estimated value of the intermediate emission with regard to an influence of the at least one second catalytic converter volume upon the emission of the at least one exhaust gas component.

According to a further embodiment, —an oxygen storage capacity of the at least one first catalytic converter volume and/or a temperature of the at least one second catalytic converter volume can be acquired or determined and—the estimated value of the intermediate emission is corrected to the estimated value of the emission in dependence upon the oxygen storage capacity of the at least one first catalytic converter volume and/or the temperature of the at least one second catalytic converter volume, a respective relationship of the respective correction to the oxygen storage capacity of the at least one first catalytic converter volume and/or to the temperature of the at least one second catalytic converter volume being predefined by the at least one predefined correction characteristic or the at least one predefined correction characteristics map. According to a further embodiment, a respective predefined correction factor can be determined in dependence upon the oxygen storage capacity of the at least one first catalytic converter volume and/or the temperature of the at least one second catalytic converter volume and wherein the estimated value of the emission is determined by multiplying the estimated value of the intermediate emission by the predefined correction factor determined in each case. According to a further embodiment, —at least one characteristic quantity of the exhaust-gas sensor that is representative of signal properties of the exhaust-gas sensor signal can be determined in dependence upon the exhaust-gas sensor signal and at least one reference signal and—the estimated value of the emission can be determined in dependence upon the at least one characteristic quantity of the exhaust-gas sensor that is determined.

According to another embodiment, a method of estimating an emission of at least one exhaust gas component, may comprise the steps of: —an exhaust-gas sensor signal of an exhaust-gas sensor that is disposed in an exhaust gas train downstream of at least one first catalytic converter volume is acquired, —at least one characteristic quantity of the exhaust-gas sensor that is representative of signal properties of the exhaust-gas sensor signal is determined in dependence upon the exhaust-gas sensor signal and at least one reference signal and—an estimated value of the emission is determined in dependence upon the at least one characteristic quantity of the exhaust-gas sensor that is determined.

According to a further embodiment of the above mentioned methods, the at least one characteristic quantity of the exhaust-gas sensor may comprise a range of values and/or a delay time and/or a rise time and/or a fall time of the exhaust-gas sensor signal. According to a further embodiment of the above mentioned methods, the at least one reference signal can be formed by a lambda setpoint value signal of a lambda closed-loop control operation. According to a further embodiment of the above mentioned methods, in dependence upon the at least one characteristic quantity at least one characteristic-quantity correction characteristic or at least one characteristic-quantity correction characteristics map can be adapted and the estimated value of the emission can be determined in dependence upon the at least one characteristic-quantity correction characteristic or the at least one characteristic-quantity correction characteristics map. According to a further embodiment of the above mentioned methods, in dependence upon an emission model the estimated value of the emission of the at least one exhaust gas component can be estimated in dependence upon the exhaust-gas sensor signal, a gradient signal that is determined as a time derivative of the exhaust-gas sensor signal, and an air-mass flow signal and wherein the correction characteristics or correction characteristics maps form a part of the emission model.

According to yet another embodiment, a device for estimating an emission of at least one exhaust gas component, can be designed to acquire an exhaust-gas sensor signal of an exhaust-gas sensor that is disposed in an exhaust gas train downstream of at least one first catalytic converter volume and upstream of at least one second catalytic converter volume, to determine an estimated value of an intermediate emission for a position of the exhaust-gas sensor in dependence upon the exhaust-gas sensor signal and to determine an estimated value of the emission downstream of the at least one second catalytic converter volume in dependence upon the estimated value of the intermediate emission and in dependence upon at least one predefined correction characteristic or at least one predefined correction characteristics map for correcting the estimated value the estimated value of the intermediate emission with regard to an influence of the at least one second catalytic converter volume upon the emission of the at least one exhaust gas component.

According to yet another embodiment, a device for estimating an emission of at least one exhaust gas component, can be designed to acquire an exhaust-gas sensor signal of an exhaust-gas sensor that is disposed in an exhaust gas train downstream of at least one first catalytic converter volume, to determine at least one characteristic quantity of the exhaust-gas sensor that is representative of signal properties of the exhaust-gas sensor signal in dependence upon the exhaust-gas sensor signal and at least one reference signal and to determine an estimated value of the emission in dependence upon the at least one characteristic quantity of the exhaust-gas sensor that is determined.

BRIEF DESCRIPTION OF THE DRAWINGS

There now follows a description of exemplary embodiments with reference to the schematic drawings, in which.

In all of the figures, elements of an identical construction or function are provided with the same reference characters.

DETAILED DESCRIPTION

Figure 1:
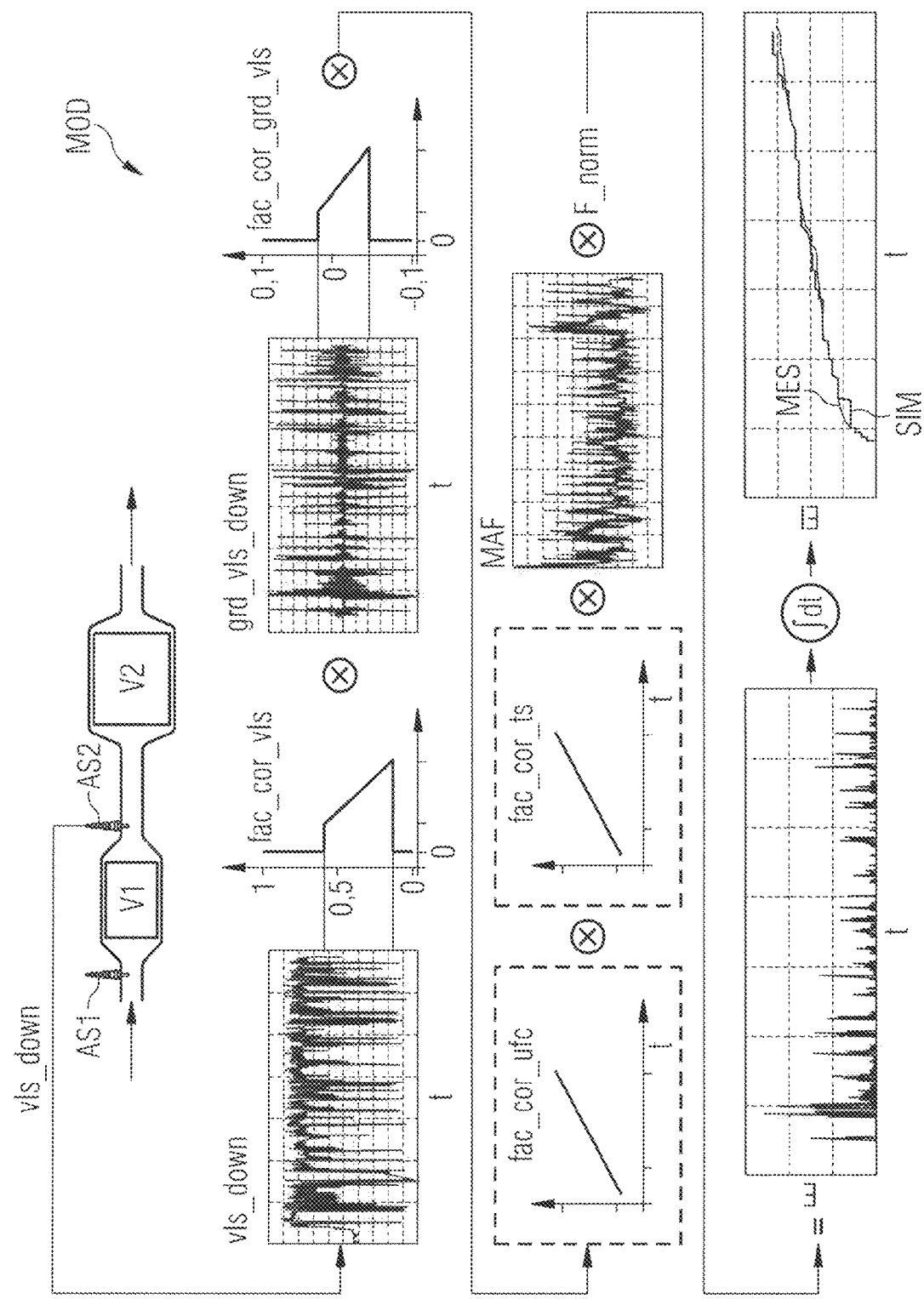
FIG. 1 part of an exhaust gas train and an emission model,
FIG. 2 part of the emission model,
FIG. 3 a representation of ageing effects of an exhaust-gas sensor and
FIG. 4 an adaptation of the emission model.

According to a first aspect, in a method and a corresponding device for estimating an emission of at least one exhaust gas component, an exhaust-gas sensor signal of an exhaust-gas sensor that is disposed in an exhaust gas train downstream of at least one first catalytic converter volume and upstream of at least one second catalytic converter volume is acquired. An estimated value of an intermediate emission for a position of the exhaust-gas sensor is determined in dependence upon the exhaust-gas sensor signal. An estimated value of the emission downstream of the at least one second catalytic converter volume is determined in dependence upon the estimated value of the intermediate emission and in dependence upon at least one predefined correction characteristic or at least one predefined correction characteristics map for correcting the estimated value of the intermediate emission with regard to an influence of the at least one second catalytic converter volume upon the emission of the at least one exhaust gas component.

The advantage is that a comparison of the estimated emission with statutory emission limits that relate to the emissions at the end of the exhaust gas train, i.e. in particular to the emissions after the at least one second catalytic converter volume, is easily possible, namely also when at least one second catalytic converter volume, in particular a sub-surface catalytic converter, is additionally provided downstream of the exhaust-gas sensor. It is moreover possible in this way to enable detection of a single cylinder trimming. Thus, a new diagnostic facility is created. A reliable on-board diagnosis is possible without there being any need for additional components in the exhaust gas system and without an active intervention in the air-fuel ratio of the internal combustion engine being required for the diagnosis. The diagnosis may therefore be effected in an emission-neutral manner.

The at least one exhaust gas component comprises in particular carbon monoxide (CO) and/or nitrous oxides (NOx) and/or hydrocarbons (HC). The influence of the at least one second catalytic converter volume upon the emission of the at least one exhaust gas component is in particular an estimated or assumed influence, i.e. an influence derived in particular from empirical values, such as may be determined for example experimentally.

In a development, an oxygen storage capacity of the at least one first catalytic converter volume and/or a temperature of the at least one second catalytic converter volume is acquired or determined. The estimated value of the intermediate emission is corrected to the estimated value of the emission in dependence upon the oxygen storage capacity of the at least one first catalytic converter volume and/or in dependence upon the temperature of the at least one second catalytic converter volume. A respective relationship of the respective correction to the oxygen storage capacity of the at least one first catalytic converter volume and/or to the temperature of the at least one second catalytic converter volume is in this case predefined by means of the at least one predefined correction characteristic or the at least one predefined correction characteristics map.

The oxygen storage capacity is generally determined in any case for diagnostic purposes for the at least one first catalytic converter volume and is therefore available for estimating the emissions. Consequently, the determined oxygen storage capacity of the at least one first catalytic converter volume may in a preferred manner be extrapolated to an oxygen storage capacity of the at least one second catalytic converter volume, preferably on the basis of empirical values that may be determined for example experimentally. This allows a conclusion to be drawn about the influence that the at least one second catalytic converter volume has upon the emissions. A reliable estimation of the emissions is therefore possible. The temperature of the at least one second catalytic converter volume is moreover easy to acquire by means of a temperature sensor or may be determined as a model value. This temperature influences the influence that the at least one second catalytic converter volume has upon the emissions. For example, the influence of the at least one second catalytic converter volume may be less in the case of a low temperature than in the case of a higher temperature. For this reason, by taking the temperature of the at least one second catalytic converter volume into account a reliable estimation of the emissions is possible.

In this connection it can be advantageous if a respective predefined correction factor is determined in dependence upon the oxygen storage capacity of the at least one first catalytic converter volume and/or the temperature of the at least one second catalytic converter volume. The estimated value of the emission is determined by multiplying the estimated value of the intermediate emission by the predefined correction factor determined in each case. The advantage is that this is very easy.

In a further development, at least one characteristic quantity of the exhaust-gas sensor that is representative of signal properties of the exhaust-gas sensor signal is determined in dependence upon the exhaust-gas sensor signal and at least one reference signal. The estimated value of the emission is determined in dependence upon the at least one characteristic quantity of the exhaust-gas sensor that is determined. The advantage is that variations of the exhaust-gas sensor with regard to its at least one characteristic quantity, which varies for example as a result of thermal or chemical loading or as a result of ageing of the exhaust-gas sensor, are easy to take into account when estimating the emission. In particular, a signal dynamic response and/or a dynamic range of the exhaust-gas sensor signal may be subject to variations. Consequently, a high level of ruggedness vis-a-vis variations to the at least one characteristic quantity may be achieved. A high degree of accuracy is moreover possible when estimating the emission. A reliable on-board diagnosis is possible. The signal properties of the exhaust-gas sensor signal comprise in particular dynamic signal properties.

According to a second aspect, in a method and a corresponding device for estimating an emission of at least one exhaust gas component, an exhaust-gas sensor signal of an exhaust-gas sensor that is disposed in an exhaust gas train downstream of at least one first catalytic converter volume is acquired. At least one characteristic quantity of the exhaust-gas sensor that is representative of signal properties of the exhaust-gas sensor signal is determined in dependence upon the exhaust-gas sensor signal and at least one reference signal. The estimated value of the emission is determined in dependence upon the at least one characteristic quantity of the exhaust-gas sensor that is determined. The advantage is that variations of the exhaust-gas sensor with regard to its at least one characteristic quantity, which varies for example as a result of thermal or chemical loading or as a result of ageing of the exhaust-gas sensor, are easy to take into account when estimating the emission. In particular, a signal dynamic response and/or a dynamic range of the exhaust-gas sensor signal may be subject to variations. Consequently, a high level of ruggedness vis-à-vis variations of the at least one characteristic quantity may be achieved. A high degree of accuracy is moreover possible when estimating the emission. A reliable on-board diagnosis is possible. The signal properties of the exhaust-gas sensor signal comprise in particular dynamic signal properties.

In a further development, the at least one characteristic quantity of the exhaust-gas sensor comprises a range of values and/or a delay time and/or a rise time and/or a fall time of the exhaust-gas sensor signal. The advantage is that these are easy to determine and that by taking into account such characteristic quantities, which may be subject to variations for example as a result of ageing of the exhaust-gas sensor, the accuracy and reliability of the estimation of the emissions may be improved.

In a further development, the at least one reference signal is formed by a lambda setpoint value signal of a lambda closed-loop control operation. The advantage is that this is easy. The lambda setpoint value signal is generally available in the context of a lambda closed-loop control operation.

In a further development, at least one characteristic-quantity correction characteristic or at least one characteristic-quantity correction characteristics map is adapted in dependence upon the at least one characteristic quantity. The estimated value of the emission is determined in dependence upon the at least one characteristic-quantity correction characteristic or the at least one characteristic-quantity correction characteristics map. This has the advantage that this is particularly easy.

In a further development, in dependence upon an emission model the estimated value of the emission of the at least one exhaust gas component is estimated in dependence upon the exhaust-gas sensor signal, a gradient signal that is determined as a time derivative of the exhaust-signal sensor, and an air-mass flow signal. The correction characteristics or correction characteristics maps form a part of the emission model. By means of such an emission model a reliable estimation of the emission is possible.

An exhaust gas after-treatment system of an internal combustion engine, for example of a motor vehicle, comprises at least one first catalytic converter volume V1 and at least one second catalytic converter volume V2, which are disposed successively in an exhaust gas train of the exhaust gas after-treatment system (FIG. 1). The at least one second catalytic converter volume V2 is disposed in the exhaust gas train downstream of the at least one first catalytic converter volume V1. Upstream of the at least one first catalytic converter volume V1 a first exhaust-gas sensor AS1 is preferably disposed, which for example takes the form of a linear lambda sensor for acquiring a residual oxygen content in the exhaust gas upstream of the at least one first catalytic converter volume V1 and which is used for example for a lambda closed-loop control operation. The first exhaust-gas sensor AS1 may however for example alternatively take the form of a binary lambda sensor. Downstream of the at least one first catalytic converter volume V1 and upstream of the at least one second catalytic converter volume V2 a second exhaust-gas sensor AS2 is disposed, which for example takes the form of a binary lambda sensor but may alternatively be of some other design. The second exhaust-gas sensor AS2 may for example be used to diagnose the at least one first catalytic converter volume V1.

The at least one first and the at least one second catalytic converter volumes V1, V2 may be formed in a catalytic converter of the exhaust gas after-treatment system. Preferably, however, the at least one first and the at least one second catalytic converter volumes V1, V2 are formed in separate catalytic converters. The at least one first catalytic converter volume V1 is preferably disposed closely adjacent to the internal combustion engine to allow it, after a start-up of the internal combustion engine, to reach the operating temperature required for the exhaust gas after-treatment within a short time. The at least one second catalytic converter volume V2 is formed for example in a sub-surface catalytic converter and so is further remote from the internal combustion engine and therefore possibly only reaches the required operating temperature later than the at least one first catalytic converter volume V1.

For determining an emission E of at least one exhaust gas component downstream of the at least one second catalytic converter volume V2 an emission model MOD is provided. The at least one exhaust gas component comprises in particular carbon monoxide (CO) and/or nitrous oxides (NOx) and/or hydrocarbons (HC) but may also comprise other or further substances. With the aid of the emission model MOD the emission E is estimated in dependence upon an exhaust-gas sensor signal vls_down of the second exhaust-gas sensor AS2. At the same time, an influence of the at least one second catalytic converter volume V2 upon the emission E is taken into account. The influence is in particular an estimated or assumed influence, i.e. an influence derived in particular from empirical values, such as may be determined for example experimentally.

By means of the emission model MOD the emission E is in a preferred manner determined as a product of the exhaust-gas sensor signal vls_down, a predefined exhaust-gas sensor-signal correction characteristic fac_cor_vls, a gradient signal grd_vls_down, a predefined gradient-signal correction characteristic fac_cor_grd_vls, a predefined correction characteristic fac_cor_ufc of the at least one second catalytic converter volume V2, an air-mass flow signal MAF and a predefined normalization factor F_norm. As a further factor a characteristic-quantity correction characteristic fac_cor_ts is preferably provided. Furthermore, the characteristic-quantity correction characteristic fac_cor_ts may also be provided as an alternative to the predefined correction characteristic fac_cor_ufc of the at least one second catalytic converter volume V2 in the emission model. The respective correction characteristics may alternatively take the form of a respective correction characteristics map. The emission model MOD may also take some other form and may in particular also comprise further factors, other factors or only a subset of the described factors.

The gradient signal grd_vls_down represents a time derivative of the exhaust-gas sensor signal vls_down. The predefined exhaust-gas sensor-signal correction characteristic fac_cor_vls and the predefined gradient-signal correction characteristic fac_cor_grd_vls are in particular provided for the cutting-out and optionally scaling of predefined signal components, for example a range of values predefined in each case, from the exhaust-gas sensor signal vls_down and/or the gradient signal grd_vls_down. Preferably, the predefined exhaust-gas sensor-signal correction characteristic fac_cor_vls and the predefined gradient-signal correction characteristic fac_cor_grd_vls are predefined in dependence upon the exhaust gas component to be determined in each case, i.e. for each exhaust gas component, for which the emission E is to be estimated, the in each case associated predefined exhaust-gas sensor-signal correction characteristic fac_cor_vls and predefined gradient-signal correction characteristic fac_cor_grd_vls is utilized.

The air-mass flow signal MAF is representative of an exhaust gas flow through the exhaust gas train and hence through the at least one first and at least one second catalytic converter volumes V1, V2. The predefined normalization factor F_norm is provided for example for supplying the estimated values of the emission E in a form and in particular a scaling that is suitable for further processing and in particular for a comparison with for example emission limit values and in particular legally specified emission limit values. The estimated emission E for the respective exhaust gas component is preferably integrated and supplied as integrated emission EI. In the case of the emission E and the integrated emission EI it is substantially a matter of different modes of representation, so that propositions made with regard to the emission E in principle also apply analogously to the integrated emission EI and vice versa. For this reason, in the following explicit reference to both the emission E and the integrated emission EI is not always made if propositions refer to both.

FIG. 2 shows a more detailed representation of the predefined correction characteristic fac_cor_ufc of the at least one second catalytic converter volume V2. According to the emission model MOD an intermediate emission or integrated intermediate emission ZEI is determined, without taking into account the predefined correction characteristic fac_cor_ufc of the at least one second catalytic converter volume V2, in dependence upon the exhaust-gas sensor signal vls_down for a position of the second exhaust-gas sensor AS2 in the exhaust gas train. FIG. 2 shows by way of example profiles of the integrated intermediate emission ZEI of various exhaust gas components over a time t. The integrated intermediate emissions ZEI of the respective exhaust gas component is multiplied by the predefined correction characteristic fac_cor_ufc of the at least one second catalytic converter volume V2, thereby resulting in the integrated emission EI of the respective exhaust gas component at a position downstream of the at least one second catalytic converter volume V2.

The predefined correction characteristic fac_cor_ufc of the at least one second catalytic converter volume V2 is formed in dependence upon a predefined oxygen-storage-capacity correction characteristic fac_cor_osc and/or in dependence upon a predefined temperature correction characteristic fac_cor_temp_ufc. The predefined oxygen-storage-capacity correction characteristic fac_cor_osc is formed in order to extrapolate a conversion efficiency of the at least one first catalytic converter volume V1 as a function of the oxygen storage capacity OSC thereof to a conversion efficiency of the at least one second catalytic converter volume V2. This is based on the knowledge that variations of the conversion efficiency of the at least one first catalytic converter volume V1, for example as a result of ageing, are generally accompanied by corresponding variations of the conversion efficiency of the at least one second catalytic converter volume V2, which are however generally smaller because of the lower thermal loading of the at least one second catalytic converter volume V2. For the respective exhaust gas after-treatment system, therefore, the relationship between the conversion efficiency of the at least one first and the at least one second catalytic converter volume V1, V2 and hence also the oxygen-storage-capacity correction characteristic fac_cor_osc are easy to determine experimentally.

The predefined temperature correction characteristic fac_cor_temp_ufc is formed in order to take into account a temperature temp_ufc of the at least one second catalytic converter volume V2. This is based on the knowledge that the temperature temp_ufc of the at least one second catalytic converter volume V2 influences the conversion efficiency thereof. Generally the conversion efficiency increases with the temperature temp_ufc of the at least one second catalytic converter volume V2.

The oxygen-storage-capacity correction characteristic fac_cor_osc or the temperature correction characteristic fac_cor_temp_ufc may form in each case the correction characteristic fac_cor_ufc of the at least one second catalytic converter volume V2. It is however preferably provided that these jointly form a correction characteristics map of the at least one second catalytic converter volume V2 that is taken into account instead of the correction characteristic fac_cor_ufc in the emission model MOD. Preferably, in dependence upon the oxygen storage capacity OSC that is determined for the at least one first catalytic converter volume V1 a predefined oxygen-storage-capacity correction factor is determined from the predefined oxygen-storage-capacity correction characteristic fac_cor_osc. Alternatively or additionally, in dependence upon the temperature temp_ufc of the at least one second catalytic converter volume V2 a predefined temperature correction factor is preferably determined from the predefined temperature correction characteristic fac_cor_temp_ufc. A resulting correction factor of the at least one second catalytic converter volume V2 is formed for example in dependence upon a product of the oxygen-storage-capacity correction factor and the temperature correction factor. This resulting correction factor is preferably stored in the correction characteristics map of the at least one second catalytic converter volume V2.

FIG. 3 shows by way of example profiles of an exhaust-gas sensor signal vls_down_a of a new second exhaust-gas sensor AS2 and of an exhaust-gas sensor signal vls_down_b of an aged second exhaust-gas sensor AS2. If the integrated emissions EI are determined in dependence upon these different exhaust-gas sensor signals by means of a further emission model MOD' that does not have the characteristic-quantity correction characteristic fac_cor_ts, then considerable variations may arise between the estimated integrated emissions EI, i.e. an estimated or simulated emission profile SIM, and the actual emissions, i.e. an actual or measured emission profile MES. This applies in particular to the aged second exhaust-gas sensor AS2.

FIG. 4 shows an adaptation ADAPT of the characteristic-quantity correction characteristic fac_cor_ts in dependence upon the exhaust-gas sensor signal vls_down, which depending on a state and in particular on a state of ageing of the second exhaust-gas sensor AS2 may resemble the exhaust-gas sensor signal vls_down_a of the new second exhaust-gas sensor AS2 or the exhaust-gas sensor signal vls_down_b of the aged second exhaust-gas sensor AS2. At least one characteristic quantity of the second exhaust-gas sensor AS2 is adapted in dependence upon the exhaust-gas sensor signal vls_down and at least one reference signal ref, which is preferably formed by a lambda setpoint value signal lsp, i.e. a feedforward control signal of a lambda value in a lambda closed-loop control operation. The at least one characteristic quantity is in particular representative of signal properties of the exhaust-gas sensor signal vls_down and is in particular representative of dynamic signal properties of the exhaust-gas sensor signal vls_down. The at least one characteristic quantity comprises for example a range of values and/or a delay time and/or a rise time and/or a fall time of the exhaust-gas sensor signal vls_down. The range of values relates in particular to a maximum and/or minimum value that the exhaust-gas sensor signal vls_down adopts. The delay time relates in particular to the time that elapses before the exhaust-gas sensor signal vls_down after a sudden change in the reference signal ref starts to follow the reference signal ref. The rise time and the fall time relate in particular to the times that elapse before the exhaust-gas sensor signal vls_down after a sudden rise and/or fall of the reference signal ref reaches its respective final value. Other or further characteristic quantities may also be provided. The at least one characteristic quantity is represented by the characteristic-quantity correction characteristic fac_cor_ts, so that the adaptation ADAPT of the at least one characteristic quantity corresponds to the adaptation ADAPT of the characteristic-quantity correction characteristic fac_cor_ts, which is preferably taken into account in the emission model MOD. It is thereby possible to ensure that the estimated or simulated emission profile SIM permanently corresponds to the actual or measured emission profile MES or at least comes close enough to enable a reliable evaluation of the emissions E. The adaptation ADAPT preferably occurs cyclically, i.e. for example at predefined intervals, for the respective updating of the characteristic-quantity correction characteristic fac_cor_ts.

What is claimed is:

1. A method of estimating an emission of at least one exhaust gas component, comprising the steps of:
   acquiring an exhaust-gas sensor signal of an exhaust-gas sensor that is disposed in an exhaust gas train downstream of at least one first catalytic converter volume and upstream of at least one second catalytic converter volume,
   determining an estimated value of an intermediate emission for a position of the exhaust-gas sensor in dependence upon the exhaust-gas sensor signal, and
   acquiring or determining at least one of an oxygen storage capacity of the at least one first catalytic converter volume and a temperature of the at least one second catalytic converter volume, and
   determining an estimated value of the emission downstream of the at least one second catalytic converter volume in dependence upon the estimated value of the intermediate emission and in dependence upon a correction factor determined from at least one predefined correction characteristic or at least one predefined correction characteristics map for correcting the estimated value of the intermediate emission with regard to an influence of the at least one second catalytic converter volume upon the emission of the at least one exhaust gas component,
   wherein the at least one predefined correction characteristic or at least one predefined correction characteristics map include predefined relationships for correcting the estimated value of the intermediate emission, and
   wherein the correction factor is determined from the at least one predefined correction characteristic or at least one predefined correction characteristics map based on the acquired or determined oxygen storage capacity of the at least one first catalytic converter volume or temperature of the at least one second catalytic converter.

2. The method according to claim 1, wherein a respective predefined correction factor is determined in dependence upon at least one of the oxygen storage capacity of the at least one first catalytic converter volume and the temperature of the at least one second catalytic converter volume and wherein the estimated value of the emission is determined by multiplying the estimated value of the intermediate emission by the predefined correction factor determined in each case.

3. The method according to claim 1, wherein at least one characteristic quantity of the exhaust-gas sensor that is representative of signal properties of the exhaust-gas sensor signal is determined in dependence upon the exhaust-gas sensor signal and at least one reference signal and
   the estimated value of the emission is determined in dependence upon the at least one characteristic quantity of the exhaust-gas sensor that is determined.

4. The method according to claim 3, wherein the at least one characteristic quantity of the exhaust-gas sensor comprises at least one of a range of values, a delay time, a rise time, and a fall time of the exhaust-gas sensor signal.

5. The method according to claim 3, wherein the at least one reference signal is formed by a lambda setpoint value signal of a lambda closed-loop control operation.

6. The method according to claim 3, wherein in dependence upon the at least one characteristic quantity at least one characteristic-quantity correction characteristic or at least one characteristic-quantity correction characteristics map is adapted and wherein the estimated value of the emission is determined in dependence upon the at least one characteristic-quantity correction characteristic or the at least one characteristic-quantity correction characteristics map.

7. The method according to claim 3, wherein in dependence upon an emission model the estimated value of the emission of the at least one exhaust gas component is estimated in dependence upon the exhaust-gas sensor signal, a gradient signal that is determined as a time derivative of the exhaust-gas sensor signal, and an air-mass flow signal and wherein the correction characteristics or correction characteristics maps form a part of the emission model.

8. A method of estimating an emission of at least one exhaust gas component, comprising the steps of:
   acquiring an exhaust-gas sensor signal of an exhaust-gas sensor that is disposed in an exhaust gas train downstream of at least one first catalytic converter volume,
   determining at least one characteristic quantity of the exhaust-gas sensor that is representative of signal properties of the exhaust-gas sensor signal in dependence upon the exhaust-gas sensor signal and at least one reference signal and determining an estimated value of the emission in dependence upon the at least one characteristic quantity of the exhaust-gas sensor that is determined,
wherein the at least one reference signal is formed by a lambda setpoint value signal of a lambda closed-loop control operation.

9. The method according to claim 8, wherein the at least one characteristic quantity of the exhaust-gas sensor comprises at least one of a range of values, a delay time, a rise time, and a fall time of the exhaust-gas sensor signal.

10. The method according to claim 8, wherein in dependence upon the at least one characteristic quantity at least one characteristic-quantity correction characteristic or at least one characteristic-quantity correction characteristics map is adapted and wherein the estimated value of the emission is determined in dependence upon the at least one characteristic-quantity correction characteristic or the at least one characteristic-quantity correction characteristics map.

11. The method according to claim 8, wherein in dependence upon an emission model the estimated value of the emission of the at least one exhaust gas component is estimated in dependence upon the exhaust-gas sensor signal, a gradient signal that is determined as a time derivative of the exhaust-gas sensor signal, and an air-mass flow signal and wherein the correction characteristics or correction characteristics maps form apart of the emission model.

12. A device for estimating an emission of at least one exhaust gas component, the device being operable
to acquire an exhaust-gas sensor signal of an exhaust-gas sensor that is disposed in an exhaust gas train downstream of at least one first catalytic converter volume and upstream of at least one second catalytic converter volume,
to determine an estimated value of an intermediate emission for a position of the exhaust-gas sensor in dependence upon the exhaust-gas sensor signal and
to acquire or determine at least one of an oxygen storage capacity of the at least one first catalytic converter volume and a temperature of the at least one second catalytic converter volume, and
to determine an estimated value of the emission downstream of the at least one second catalytic converter volume in dependence upon the estimated value of the intermediate emission and in dependence upon a correction factor determined from at least one predefined correction characteristic or at least one predefined correction characteristics map for correcting the estimated value the estimated value of the intermediate emission with regard to an influence of the at least one second catalytic converter volume upon the emission of the at least one exhaust gas component,
wherein the at least one predefined correction characteristic or at least one predefined correction characteristics map include predefined relationships for correcting the estimated value of the intermediate emission, and
wherein the correction factor is determined from the at least one predefined correction characteristic or at least one predefined correction characteristics map based on the acquired or determined oxygen storage capacity of the at least one first catalytic converter volume or temperature of the at least one second catalytic converter.

13. The device according to claim 12, wherein a respective predefined correction factor is determined in dependence upon at least one of the oxygen storage capacity of the at least one first catalytic converter volume and the temperature of the at least one second catalytic converter volume and wherein the estimated value of the emission is determined by multiplying the estimated value of the intermediate emission by the predefined correction factor determined in each case.

14. The device according to claim 12, wherein the device is further operable
to determine at least one characteristic quantity of the exhaust-gas sensor that is representative of signal properties of the exhaust-gas sensor signal in dependence upon the exhaust-gas sensor signal and at least one reference signal and
to determine the estimated value of the emission in dependence upon the at least one characteristic quantity of the exhaust-gas sensor that is determined.

15. A device for estimating an emission of at least one exhaust gas component, the device being operable
to acquire an exhaust-gas sensor signal of an exhaust-gas sensor that is disposed in an exhaust gas train downstream of at least one first catalytic converter volume,
to determine at least one characteristic quantity of the exhaust-gas sensor that is representative of signal properties of the exhaust-gas sensor signal in dependence upon the exhaust-gas sensor signal and at least one reference signal and
to determine an estimated value of the emission in dependence upon the at least one characteristic quantity of the exhaust-gas sensor that is determined,
wherein the at least one reference signal is formed by a lambda setpoint value signal of a lambda closed-loop control operation.

16. The device according to claim 15, wherein the at least one characteristic quantity of the exhaust-gas sensor comprises at least one of a range of values, a delay time, a rise time, and a fall time of the exhaust-gas sensor signal.

17. A method of estimating an emission of at least one exhaust gas component, comprising:
acquiring an exhaust-gas sensor signal of an exhaust-gas sensor that is disposed in an exhaust gas train downstream of at least one first catalytic converter volume but upstream of at least one second catalytic converter volume,
acquire or determine at least one of an oxygen storage capacity of the at least one first catalytic converter volume and a temperature of the at least one second catalytic converter volume, and
using an emission model to determine an estimated value of the emission from the at least one second catalytic converter volume based at least on (a) the exhaust-gas sensor signal, (b) a gradient signal determined as a time derivative of the exhaust-gas sensor signal, (c) an air-mass flow signal, and (d) a correction factor based at least on the acquired or determined oxygen storage capacity of the at least one first catalytic converter volume or temperature of the at least one second catalytic converter volume.

* * * * *